United States Patent [19]

Meyers et al.

[11] Patent Number: 4,756,506

[45] Date of Patent: Jul. 12, 1988

[54] FLEXIBLE VALVE

[75] Inventors: Elwood J. Meyers; Laurence E. Jones, both of Rockford, Ill.

[73] Assignee: Barber-Colman Company, Loves Park, Ill.

[21] Appl. No.: 928,197

[22] Filed: Nov. 7, 1986

[51] Int. Cl.⁴ .......................... F16K 31/04; F16K 5/04

[52] U.S. Cl. .................................. 251/129.11; 251/86; 403/57

[58] Field of Search ...................... 251/129.11, 86, 87; 464/120, 112; 403/57

[56] References Cited

U.S. PATENT DOCUMENTS

| | | | |
|---|---|---|---|
| 2,687,024 | 8/1954 | George | 464/112 |
| 3,347,235 | 10/1967 | Hunnicutt | 251/129.11 X |
| 3,429,232 | 2/1969 | Weiss | 251/129.11 X |
| 4,647,006 | 3/1987 | Glynn et al. | 251/129.11 X |

*Primary Examiner*—Arnold Rosenthal

*Attorney, Agent, or Firm*—Jones, Day, Reavis & Pogue

[57] ABSTRACT

A rotor is provided for use in combination with a stator and sleeve to function as a valve attached to an actuator. The rotor is comprised of a rotor body containing the drive section with the necessary elements to turn the rotor within the stator and sleeve, and a rotor stem with parts to act with complementary parts on the sleeve to form variable orifices that function as the valve. The rotor body is connected to the rotor stem by a flexible joint which includes a contoured surface to compensate for misalignments in the system.

5 Claims, 3 Drawing Sheets

FLEXIBLE VALVE

BACKGROUND OF THE INVENTION

The present invention relates generally to the rotor element of fluid control valves or a rotor used with an actuator. In particular, it relates to the rotor element of electrically actuated valves of the type utilized in internal combustion engines as governors to throttle the flow of fuel so as to moderate fuel pressure.

In internal combustion engines, and in manufacturing applications such as chemical processing, it is often necessary to control fluids flowing through lines of 0.98 to 0.789 cm in diameter. The fluids traversing these lines flow at a relatively fast rate. Due to the nature of the end process of the fluid, it is sometimes necessary to change the fluid flow rate, often from full on to full off, at rapid rates, over a sustained period of time.

Valves have been designed which are able to control fluid flow, by opening and closing their orifices, and which are able to withstand the wear of vigorous use. One such valve is disclosed in U.S. Pat. No. 4,339,737 to Meyers and Glynn. This valve comprises a rotor having a magnetically actuated rotor body housed in a stator with a coil means, and a hollow rotor stem housed in a valve sleeve. The rotor body-rotor stem is a one piece unit. The rotor stem and the valve sleeve each have a pair of symmetrical ports, which when aligned allow unrestricted fluid flow. The valve is inserted into the body of a fuel pump so that the valve sleeve and rotor stem are located in the cavity of the pump. Within the cavity the fuel is under pressure, so that when the ports on the rotor stem and valve sleeve are aligned, fuel is forced through the rotor stem and out the valve sleeve through lines connected thereto. Energizing the stator coil attracts the magnetic poles on the rotor, causing it to turn. The movement of the rotor causes the orifice formed by the two sets of ports to change size, thus controlling the flow rate of fluid flowing through the valve. Through the use of magnets, guides, and springs, the rotor turns at a constant rate, turns only through a defined arc, and returns to its original position when the stator is deenergized. An additional feature of this device is a rotor stem extending below the valve ports. This rotor stem, resting in the valve sleeve, serves to stabilize the rotor as it turns.

One disadvantage of the valves of this type is that they are affected by stress from the liquid in the pump cavity. The liquid in the pump cavity is under changing pressure that subjects the valve sleeve wih the rotor stem therein to lateral forces, causing the valve sleeve to bend. The bending of the valve sleeve may cause the rotor stem to bend, forcing it out of alignment. Such bending may also serve to reduce the lifespan of the valve.

One device which attempts to overcome this disadvantage is disclosed in U.S. application Ser. No. 729,917 which has the same assignee as the present invention. Unlike the device of U.S. Pat. No. 4,339,737, the rotor body-rotor stem of Ser. No. 729,917 is of a two-piece construction, such that relative pivoting motion between the rotor body and rotor stem is possible. In this manner some of the stresses on the rotor are alleviated.

While this design alleviates, to some extent, the problems caused by the liquid under pressure associated with the single piece rotor body-rotor stem design, it does not allow optimum pivoting motion at the flexible joint of the rotor stem.

Thus it is an object of this invention to provide a rotor of such design so as to freely flex within the valve sleeve. This design insures that the complementary parts will stay aligned, thereby maintaining the efficiency of the valve. A further advantage of this design is that wear on the device will be reduced thus increasing the useful life of the valve.

In systems known to the applicant, the manufacture of such valves is extremely difficult. This is in part because the various valve elements are of relatively small size; stators are 1.969–3.937 cm high, and at their smallest, may be 0.787–1.575 cm across. The rotor stem required to fit inside the sleeve is, of course, smaller; it may be 1.575–2.756 cm high and at its smallest 0.098–.591 cm in diameter. Because the various valve parts are required to be precisely aligned, the parts must be assembled precisely. As a result, the cost of manufacturing these valves is relatively high.

Hence, it is an additional objective of this invention to provide a valve rotor of such design that it can be inserted into the valve sleeve without precise alignment and yet will function properly.

BRIEF DESCRIPTION OF THE INVENTION

The foregoing and other objects of the invention are achieved by providing the rotor with a stem attached to the rotor body in a flexible manner allowing it to be disposed properly in the stator sleeve while the rotor body aligns with that sleeve. The flexible coupling is shaped to allow the rotor body to stay aligned regardless of any bending by the sleeve or any misalignments caused by installation that would otherwise cause the stem to stick.

DETAILED DESCRIPTION OF THE INVENTION

Figure 1:
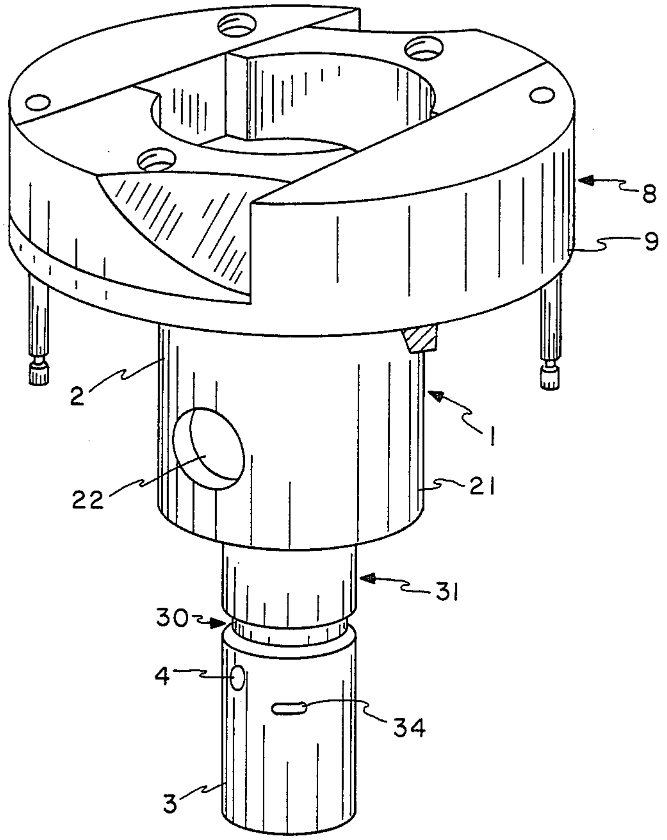
FIG. 1 is a perspective top view of the rotor.

Referring more particularly to FIG. 1, reference numeral 1 refers generally to a rotor. The rotor 1 is composed of a rotor body 2 coupled to a rotor stem 3 by a connecting pin 4.

Figure 2:
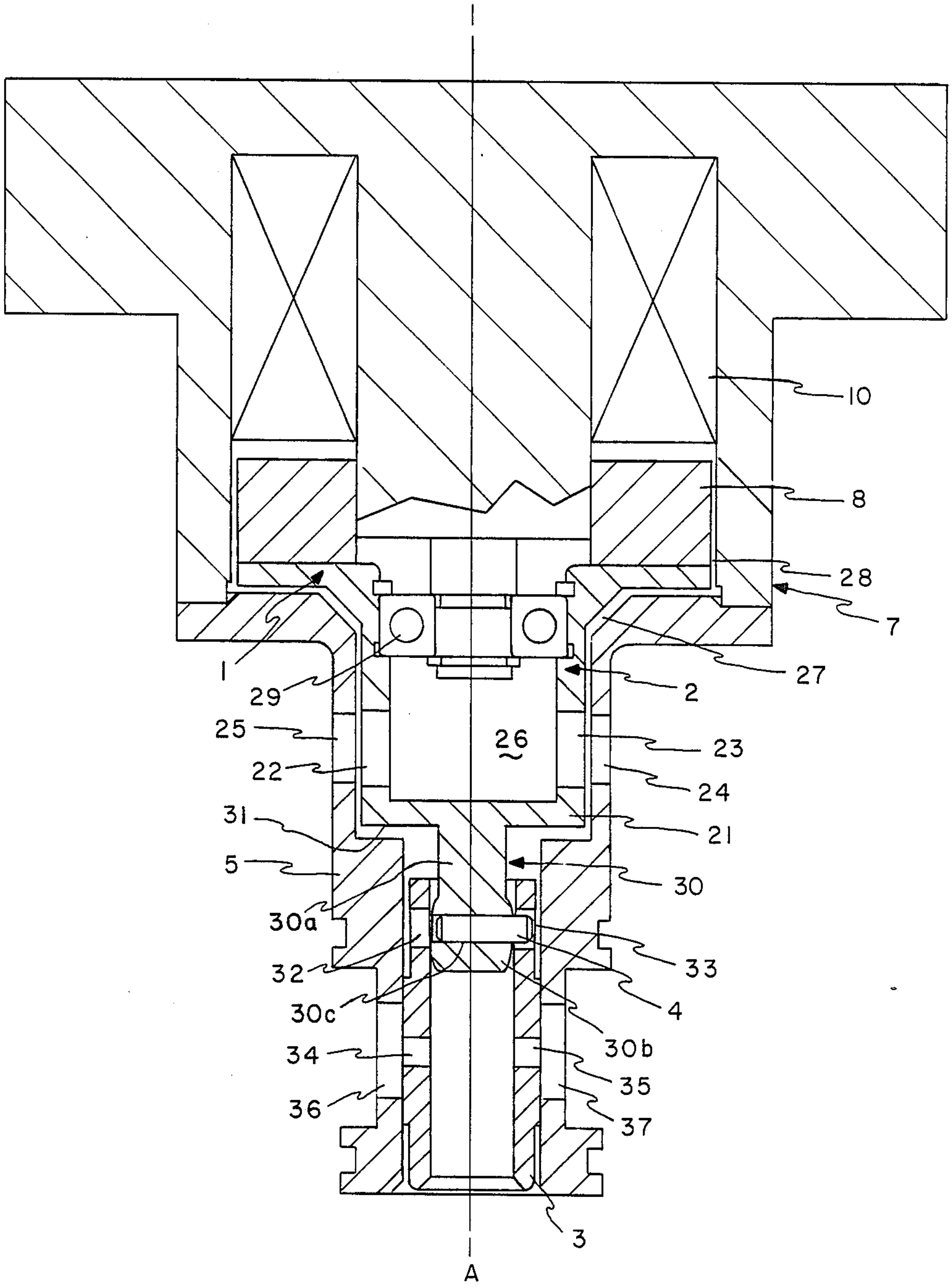
FIG. 2 is a sectional view of the rotor of FIG. 1 mounted in a stator and fitted into a valve sleeve.

FIG. 2 illustrates how the rotor 1 is mounted so that the rotor stem 3 and bottom portion of the rotor body 2 are located inside a valve sleeve 5 with the top portion of the rotor body located in stator 7 to constitute an electrically controlled valve.

The rotor body 2 comprises a drive section 8 having a cylindrically shaped outer surface 9 rotating in response to the energization of a coil 10 mounted in stator 7. The construction of the drive is described in copending application Ser. No. 729,917 and will not be repeated here.

Extending downward from the underside of drive section 8 is a tubular port section 21 coextensive with drive section 8. The port section 21 is provided with a pair of diametrically opposed radial ports 22,23 which, in conjunction with corresponding stator ports 24,25, provide an opening allowing fluid to flow into a space between the rotor 1 and the valve sleeve 5 and stator 7. Fluid entering the space 26 passes upwardly under pressure, through a space 27 between the bottom of the drive section 8 and the stator 7. The fluid then travels upwardly through a space 28 between the stator wall and the drive section 8. By virtue of this arrangement the pressure on opposite sides of the drive section 8, including the bearing 29, is equalized to relieve pressure on the bearing. The fluid also functions as cooling and lubricating agents for these rotary parts.

A connector section 30 extends downward from the center of a bottom portion 31 of the rotor body 2. The connector section 30 has an upper portion 30*a* which is cylindrically shaped and a lower portion 30*b* which is basically barrel-like in shape, where the outer surface of the lower portion 30*b*is contoured to facilitate the pivoting movement of the connector section 30 within the rotor stem 3. Located centrally in the lower portion 30*b* is a bore or opening 30*c* disposed perpendicularly to the longitudinal axis A of the valve.

Figure 3:
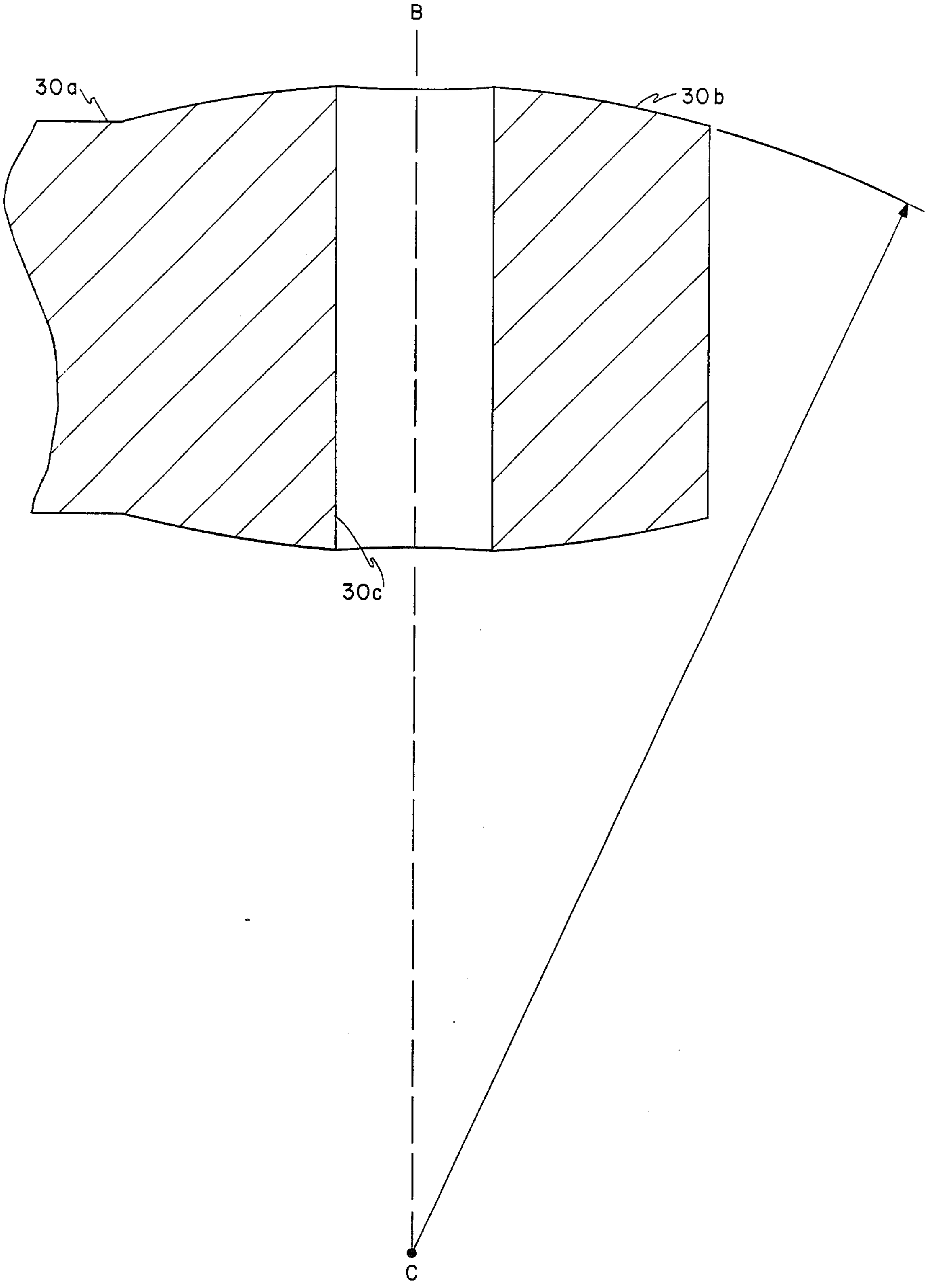
FIG. 3 is an enlarged section view of the connector section shown in FIG. 2.

Specifically, as shown in FIG. 3, the surface of the lower portion 30*b* is shaped in cross-section as an arc of a chord of a circle whose center C lies on the longitudinal axis B of the bore 30*c*.

A cylindrical connecting pin 32 is friction fitted into the bore 30*c* of the connector section lower portion 30*b*. The length of the pin is such that one end of the pin terminates substantially flush with the surface of the lower portion 30*b* while the other end of the pin terminates beyond the surface of the lower portion 30*b* a distance substantially equal to the thickness of the rotor stem 3.

The rotor stem 3 is a cylindrical tube section with an inside diameter slightly greater than the connector section lower portion 30*b*, and an outside diameter slightly less than the inside diameter of the valve sleeve 5. The rotor stem extends downward from the connector section 30 and is connected thereto by the connecting pin 32 which extends beyond the surface of the lower portion 30*b* and through one of the symmetrical mounting holes 32,33 located in the top of the rotor stem.

The rotor stem 3 has a pair of diametrically opposed ports 34,35 located near its lower end. These ports in combination with ports 36,37 on the valve sleeve 5 form variable orifices to control fluid flow.

The rotor stem 3, as may be seen, is disposed in the valve sleeve 5 and is attached to the rotor body 2 by connecting pin 4. By virtue of this connection, the rotor stem 3 may freely pivot in two perpendicular planes. This flexibility allows the rotor stem to pivot with the valve sleeve when the valve sleeve is flexed by pressure in the pump cavity. Thus, binding of the rotor stem is avoided and wear is reduced. Further, ease of manufacture is enabled because greater dimensional variations are accommodated.

In the operation of the device fluid from the pump cavity enters valve sleeve 5 and exits through the variable openings provided by ports 34 and 35 in the valve sleeve and ports 36 and 37 in the rotor stem.

While we have shown and described an embodiment of this invention in some detail, it will be understood that this description and illustration is offered merely by way of example, and that the invention is to be limited only by the appended claims.

What is claim is:

1. In a rotor used in combination with a stator and a valve sleeve to form a valve and valve body actuator, said rotor having a rotor body, a portion of said rotor body located within and operatively connected to said stator such that rotation of said stator rotates said stator body, a further portion of said rotor body extending into said valve sleeve, said rotor stem constituting a valve portion having communicating ports to act in conjunction with ports on said valve sleeve to form variable sized orifices to function as a valve element; a flexible means located within said valve sleeve for attaching said rotor stem to said rotor body, wherein said flexible means comprises a connecting section extending downward from and coextensive with said rotor body and having a diameter less than the inside diameter of the rotor stem, the improvement wherein said connecting section has a curved portion provided with a bore; a mounting pin located within said bore and sized such that a first end of said mounting pin is substantially flush with the surface of said curved portion while the second end of said mounting pin extends from said curved portion a distance substantially equal to the thickness of the rotor stem; mounting holes located near the top of said rotor stem of a diameter large enough to accomodate said mounting pin second end so that said rotor stem can be inserted over said connecting section and secured to said connecting section by said mounting pin passing through one of said mounting holes and through said connecting section, the curved portion being configured such that the distance between the surface of the curved portion and the inside surface of the rotor stem varies, so that said valve element can pivot in two perpendicular planes within said valve sleeve when said valve sleeve is subject to lateral bending in response to external forces.

2. The device of claim 1, wherein said curved portion is barrel shaped.

3. The device of claim 1, wherein the surface of said curved portion is shaped in cross-section as an arc of a chord of a circle whose center line lies on the longitudinal axis of the bore.

4. The device of claims 2 or 3, wherein said connecting section has an upper portion joining said curved portion to said rotor body and said curved portion extends between said upper portion and the end of said connecting section such that said bore is centrally located in said curved portion.

5. The device of claim 4, wherein said connecting section is narrower than said curved portion.

* * * * *